United States Patent

[11] 3,572,861

[72] Inventors: Walter Clark Rogers, Jr.
3417 Greenhill Dr., High Point, 27260;
Morton Snitzer, 3217 Ridge Crest Dr., Rocky Mount, N.C. 27801
[21] Appl. No.: 791,474
[22] Filed: Jan. 15, 1969
[45] Patented: Mar. 30, 1971

[54] SWIVEL AND METHOD OF MAKING SAME
3 Claims, 12 Drawing Figs.
[52] U.S. Cl. .................................................. 308/227, 248/425
[51] Int. Cl. ............................................... F16c 14/10
[50] Field of Search ........................................... 308/227, 235, 230, 233; 248/425, 349

[56] References Cited
UNITED STATES PATENTS
| | | | |
|---|---|---|---|
| 2,404,420 | 7/1946 | Wheeler | 308/235 |
| 2,779,642 | 1/1957 | Matthews | 248/425 |
| 2,916,084 | 12/1959 | Bottemillen et al. | 248/425 |

FOREIGN PATENTS
| | | | |
|---|---|---|---|
| 231,396 | 4/1925 | Great Britain | 308/227 |

Primary Examiner—Edward C. Allen
Attorney—Beveridge & DeGrandi

ABSTRACT: A swivel comprising a first pair of plates fixed together in overlying relationship and having an aperture with the edges of one of the plates defining the aperture deformed outwardly to provide an outer race; a second pair of plates fixed together in overlying relationship and received in the aperture of said first pair of plates with the peripheral edges of one of said second pair of plates being deformed outwardly to provide an inner race; and ball bearing members received in said races. In applying the swivel to a swivel chair, one pair of plates is secured to a seat member while the other pair of plates is secured to a base member such that the seat member may rotate about a vertical axis relative to the base and with the weight of the seat member being transmitted to the base solely through the swivel.

One method of forming the swivel includes cutting out a pair of identical circular portions from two plates, preferably when in overlying relationship, to provide a first pair of plates having similar circular apertures and a second pair of circular plates dimensioned to be received in said apertures. The cut edges of one plate in each pair are then deformed to define inner and outer races when the plates are subsequently assembled in overlying relationship with the circular plates received in the first pair of plates. The first pair of plates are then welded together and placed on a jig in overlying relationship and with their apertures aligned and receiving one of the circular plates to form an open trough into which ball bearings are then placed. The other circular plate is then welded to the associated circular plate to close the trough and complete the assembly.

PATENTED MAR 30 1971

INVENTORS
WALTER C. ROGERS, JR.
MORTON SNITZER

BY Browne, Schuyler & Beveridge
ATTORNEYS

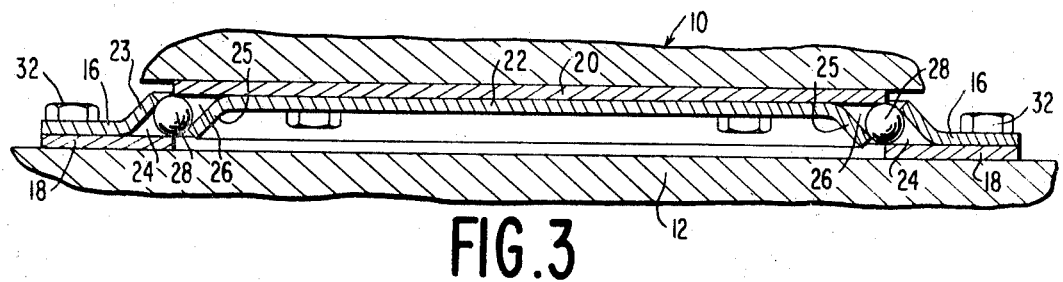
FIG. 3
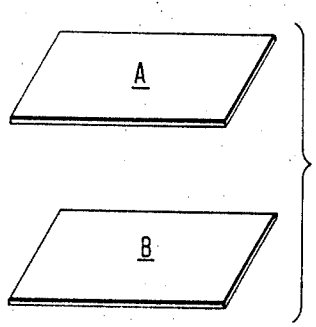
FIG. 6A
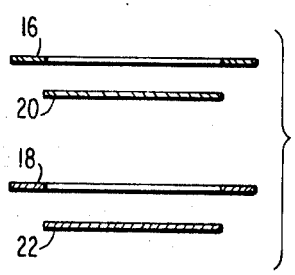
FIG. 6B
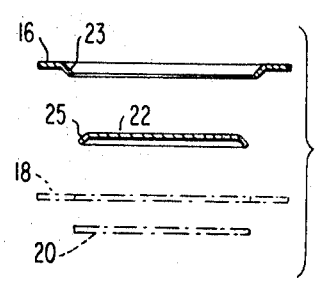
FIG. 6C
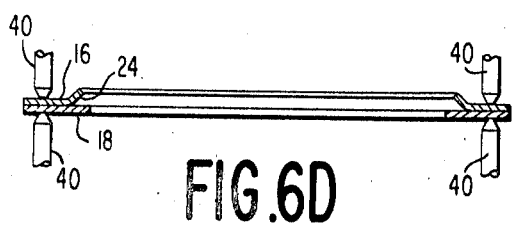
FIG. 6D
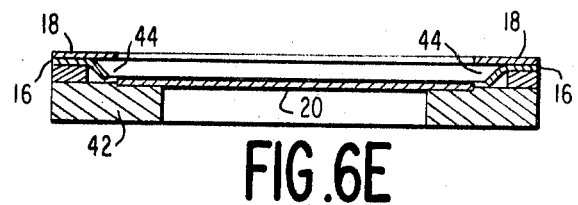
FIG. 6E
FIG. 6F
FIG. 6G
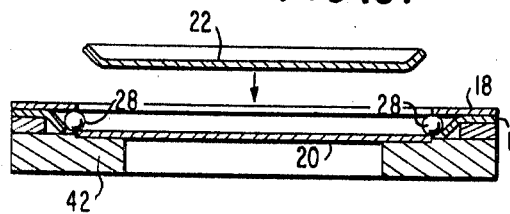
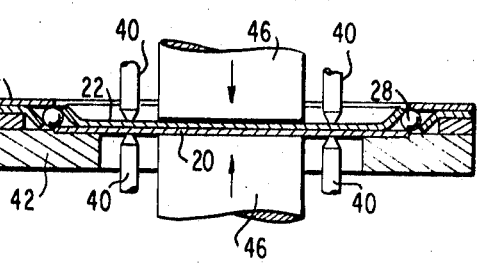
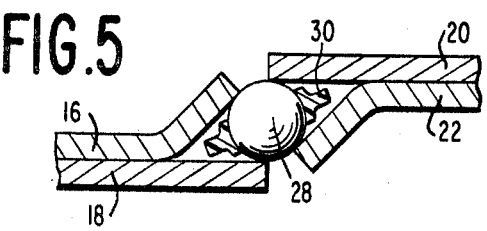
FIG. 5
INVENTORS
WALTER C. ROGERS, JR.
MORTON SNITZER
BY Browne, Schuyler & Beveridge
ATTORNEYS

SWIVEL AND METHOD OF MAKING SAME

The present invention relates to an improved swivel particularly suitable for use in swivel chairs. Also the invention relates to a method of making the swivel.

In prior art and conventional swivel chairs, a pin is often employed to interconnect the upper movable chair part with the lower part of the chair so that the upper chair part is rotatable about the axis of the pin. In some constructions ball bearing members are placed between the upper and lower chair parts to decrease friction therebetween. With such prior constructions, the upper chair part has a tendency to develop, through repeated wear, a rocking motion about the pin relative to the lower chair part. In addition to producing unwanted rocking and slack movement, this condition also increases the engagement between the upper and lower chair parts thereby inhibiting rotative movement of the upper chair part relative to the lower chair part. In one prior attempt to solve this problem, additional ball bearings are placed between the pin and the chair parts. However this has been found to unduly complicate the swivel construction without entirely solving the aforementioned problem.

Accordingly it is an object of the present invention to overcome the aforementioned problem by the provision of an improved swivel which substantially reduces unwanted rocking movement at the swivel while at the same time permitting free rotation of the swivel parts.

A further object of the present invention is to provide such a swivel which may be economically manufactured and incorporated into standard or other swivel chairs.

A still further object of the present invention is to provide a novel method of making the swivel.

In brief, the present invention achieves the above objects in a swivel chair by eliminating the conventional pin from the swivel and connecting the upper and lower chair parts solely through means of the swivel.

Included in the swivel of the invention is an outer composite plate member having a central aperture around which is formed in this plate member and annular race; and a composite circular inner plate member having in its periphery an inner race. The inner plate member is received in the aperture of the outer plate member and ball bearings are positioned in the inner and outer races. The two plate members are connected to the upper and lower chair parts respectively so as to provide rotation of the upper chair part relative to the lower chair part about the swivel axis.

In accordance with another aspect of the present invention, the swivel is formed by superposing two steel plates in overlying relationship and cutting out identical circular portions to produce a first pair of plates having similar circular apertures and a second pair of circular plates dimensioned to be received in said apertures. The cut edges of one plate in each pair are then deformed to define inner and outer races when the plates are subsequently assembled in overlying relationship with the circular plates received in the apertures of the first pair. The first pair of plates are then welded together and placed on a jig in overlying relationship and with their apertures aligned and receiving one of the circular plates to form an open trough into which ball bearings are then placed. The other circular plate is then welded to the first set circular plate to close the trough and complete the assembly. The angularity of the deformed plate portions which define the races is designed so that it in closing the trough prior to welding, the deformed portion of the last assembled circular plate is deflected outwardly so that after welding, the ball bearings are constantly under spring pressure thereby eliminating slack from the swivel.

Other objects and advantages will become apparent from the foregoing more detailed description in the attached drawings in which:

FIG. 3 is an enlarged cross-sectional, view of the swivel assembly taken along a diametrical plane with portions of the associated chair parts broken away;

FIG. 5 is a cross-sectional view of a portion of a swivel assembly incorporating the spacer member of FIG. 4;

FIGS. 6A through 6G, inclusive are assembly views showing sequential steps in forming the swivel assembly.

DETAILED DESCRIPTION

Figure 4:
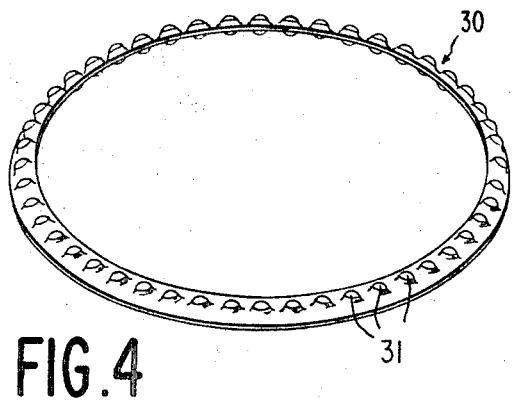
FIG. 4 is a perspective view of a ball bearing spacer member which may be incorporated in the swivel assembly.
Figure 1:
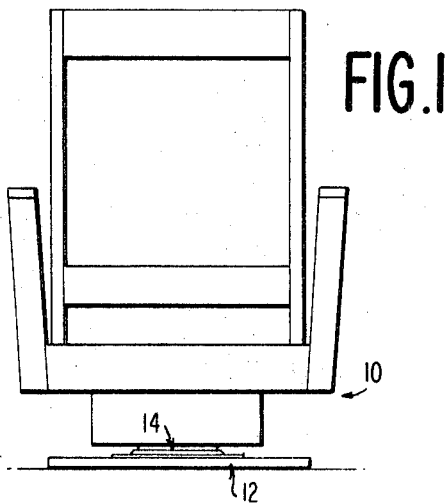
FIG. 1 is a front elevational view of a chair in which is incorporated a swivel assembly embodying the present invention.

Referring now to the drawings in detail, there is shown in FIG. 1 a chair including a seat portion 10 mounted on a base 12 by means of a swivel assembly generally designated 14 constructed and employed in the chair in accordance with the present invention. Swivel assembly 14 allows seat portion 10 to rotate about a vertical axis relative to base 12.

Figure 2:
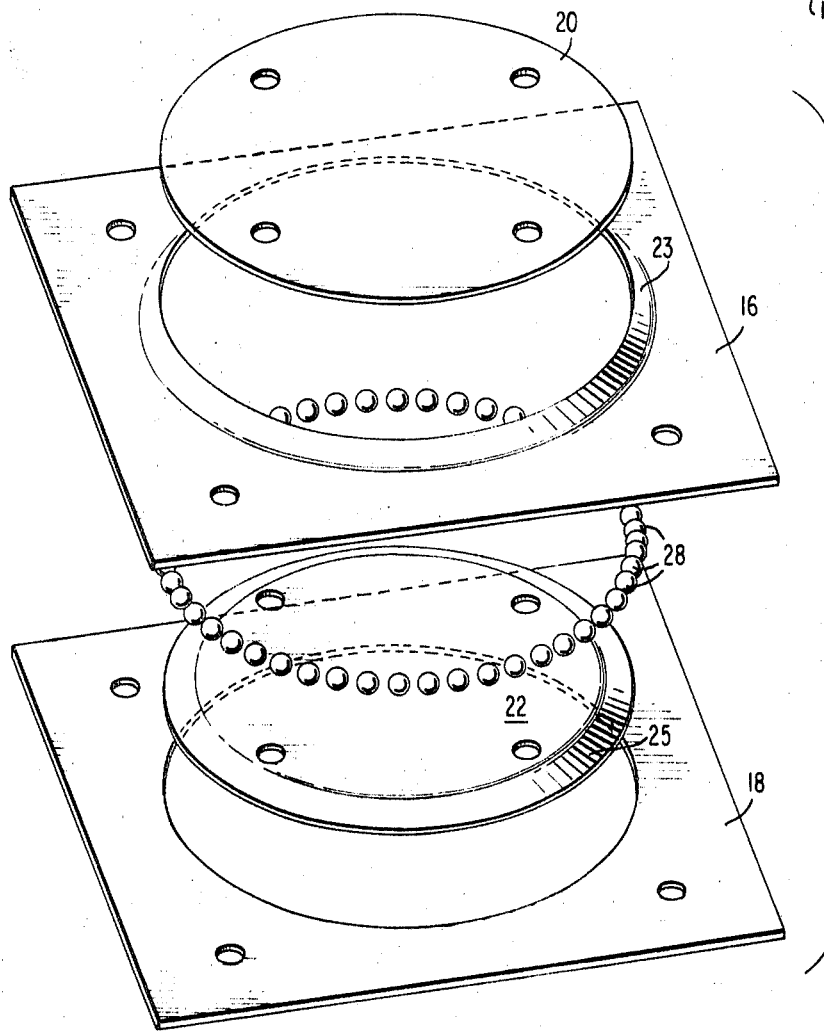
FIG. 2 is an enlarged, exploded, perspective view of the swivel assembly.

Swivel assembly 14 includes a pair of apertured outer plates 16, 18 made from suitable material such as steel, welded together in superimposed relationship to define a central cavity or aperture; and a pair of inner circular plates or discs 20, 22 made from similar material welded together so as to be received in the aperture of the outer plates. Plate 16 which is shown as the upper outer plate is deformed at 23 outwardly along the periphery of its aperture to define with the lower outer plate 18 an outer race 24. Similarly, plate 22 which is shown as the lower inner plate is deformed outwardly along its peripheral edge portion 25 to define with the upper inner plate an inner race 26. As shown in FIG. 2, the deformed portions 23, 25 of the plates extend continuously in a circular path.

Located in and filling the races 24, 26 are bearing members which may be steel balls 28. If desired an annular spacer ring 30 having a plurality of circumferentially spaced apertures 31 may be provided so as to receive and thereby locate and space the ball bearings 28 in the races. Preferably spacer ring 30 is made from a molded plastic. Referring to FIG. 3, installation of the swivel assembly in the chair is effected by securing the outer plate assembly 16, 18 to the base 12 such as by means of screws or bolts 32, and the inner plate assembly 20, 22 to the upper seat portion 10. No other connecting means is employed between seat portion 10 and base 12. Thus in effect, upper seat portion 10 has a limited floating or resilient suspension with respect to base 12 while at the same time being free to rotate relative to the base to provide the desired movement. It should be understood that the position of the inner and outer plate assemblies may be reversed from that shown in FIG. 3 so that the inner plate assembly 20, 22 may be attached to the base 12 of the chair and the outer plate assembly 16, 18 to the upper seat portion of the chair.

Referring now to FIGS. 6A through 6G, and in accordance with another aspect of the present invention, the swivel assembly is fabricated by starting with a pair of plates A, B shown in FIG. 6A. As shown in FIG. 6B, plates A, B are cut by means of a suitable punch (not shown) to provide outer plates 16, 18 and inner plates 20, 22 of the assembly. It is preferable this punching operation be achieved in a single step, that is while the plates are in overlying relationship. The next step is to deform portions 23 and 25 of outer and inner plates 16 and 22 as illustrated in FIG. 6C. The other plates 16, 20 are maintained in their planar condition.

FIG. 6D illustrates the next step wherein the outer plates 16, 18 are assembled in coaxial superimposed relationship to define the outer race 24 and then welded together, numerals 40 designating the welding rods. The welded outer plate assembly 16, 18 is then placed on a jig 42 as shown in FIG. 6E, and then the undeformed inner plate 20 is placed on jig 42 within the aperture of the outer plates so as to form an open trough 44. Ball bearings 28 are then placed in the open trough 44 as illustrated in FIG. 6F. The other, deformed, circular plate is then brought into position in overlying contact with the inner circular plate 20 so as to close the trough 44. Then the inner plates 20, 22 are welded together as illustrated by the welding rods 40 to complete the assembly. Prior to this final welding step, it is necessary that the inner plates be forced together such as by any suitable clamping members such as represented at 46. This is because the deformed portions 23, 25 of the plates are designed so that to close the trough and to weld the inner plate members together, it is necessary to resiliently deflect deformed portions 23, 25 outwardly. In this way resilient spring pressure is exerted on the ball bearings by the deformed portions to eliminate slack during use of the assembly.

We claim:

1. A swivel comprising in combination, a first pair of plates fixed together in overlying relationship, peripheral portions of at least one of said plates being deformed outwardly away from the other plate to define an inner race, a second pair of plates fixed together in overlying relationship and having an aperture extending therethrough receiving said first pair of plates, at least one of said second pair of plates having its edge portions surrounding said aperture deformed outwardly from the other plate in said second pair to define an outer race, and bearing members received in said inner and outer races such that said first and second pairs of plates are rotatable relative to each other, said deformed portions of said first and said second pairs of plates being formed from resilient material and said inner and outer races when unstressed prior to assembly defining cavities slightly less than the overall dimension of the bearing members, installation of said bearing members into said cavities being achieved by resilient deflection of said deformed portions whereby after final assembly said deformed portions constantly exert pressure on bearing members eliminating slack.

2. A swivel comprising in combination, a first pair of plates fixed together in overlying relationship, peripheral edge portions of at least one of said plates extending outwardly away from the other plate to define an inner race, a second pair of plates fixed together in overlying relationship and having an aperture extending therethrough receiving said first pair of plates, at least one of said second pair of plates having its edge portions surrounding said aperture extending outwardly away from the other plate in said second pair to define an outer race, and bearing members received in said inner and outer races such that said first and second pairs of plates are rotatable relative to each other, said edge portions of said first and second pairs of plates being formed from resilient material and said inner and outer races when unstressed prior to assembly defining cavities slightly less than the overall dimension of the bearing members, installation of said bearing members into said cavities being achieved by resilient deflection of said edge portions whereby after final assembly said edge portions constantly exert pressure on said bearing members eliminating slack.

3. The swivel defined in claim 2 wherein said inner and outer races lie in closely spaced parallel planes and have generally V-shaped cross sections with the inner and outer races in registry with each other at an acute angle relative to said planes.